(12) United States Patent
Shirakura (10) Patent No.: US 6,400,474 B2
(45) Date of Patent: Jun. 4, 2002

(54) IMAGE RECORDING APPARATUS AND HOLOGRAPHIC RECORDING MEDIUM CARTRIDGE

(75) Inventor: Akira Shirakura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/835,626

(22) Filed: Apr. 17, 2001

(30) Foreign Application Priority Data

Apr. 18, 2000 (JP) ......................................... 2000-122418

(51) Int. Cl.[7] ................................................. G03H 1/26
(52) U.S. Cl. ............................... 359/23; 359/22; 359/35
(58) Field of Search ............................. 359/22, 23, 35; 396/395

(56) References Cited

U.S. PATENT DOCUMENTS 4,206,965 A * 6/1980 McGrew ...................... 359/23
6,023,356 A * 2/2000 Kihara et al. ................ 359/23

* cited by examiner

*Primary Examiner*—Darren Schuberg
(74) *Attorney, Agent, or Firm*—Radar, Fishman & Grauer PLLC; Ronald P. Kananen, Esq.

(57) ABSTRACT

A slit head 76A is provided prior to intermittent feed rollers 73A and 73B. The slit head 76A is made of a rigid body such as magnetic iron and is used as a contact member. The slit head 76A is provided with a slit 78 on the side of a reference light L4 in the vicinity of an exposure position P1. The reference light L4 is transmitted through the slit 78 of the slit head 76A. In addition to magnetic iron, stainless steel and the like are used for the contact member 76A. On the side of an object light L3 at the exposure position P1, there is provided a presser plate member 76B for pressing the holographic recording medium 10 against the slit head 76A. The presser plate member 76B is also provided with a slit 82 and is arranged corresponding to an incident position of the object light L3. A magnetic member is used for the presser plate member 76B.

7 Claims, 9 Drawing Sheets

IMAGE RECORDING APPARATUS AND HOLOGRAPHIC RECORDING MEDIUM CARTRIDGE

BACKGROUND OF THE INVENTION

1. Technical Field

The present invention relates to an image recording apparatus for creating a holographic stereogram recorded so that a photographed image or a computer-generated image can be observed three-dimensionally.

2. Description of Related Art

To create a holographic stereogram, for example, a subject is photographed from different observation points to generate many images as original pictures. These images are sequentially recorded as strip or dot element holograms on a single holographic recording medium.

Figure 1:
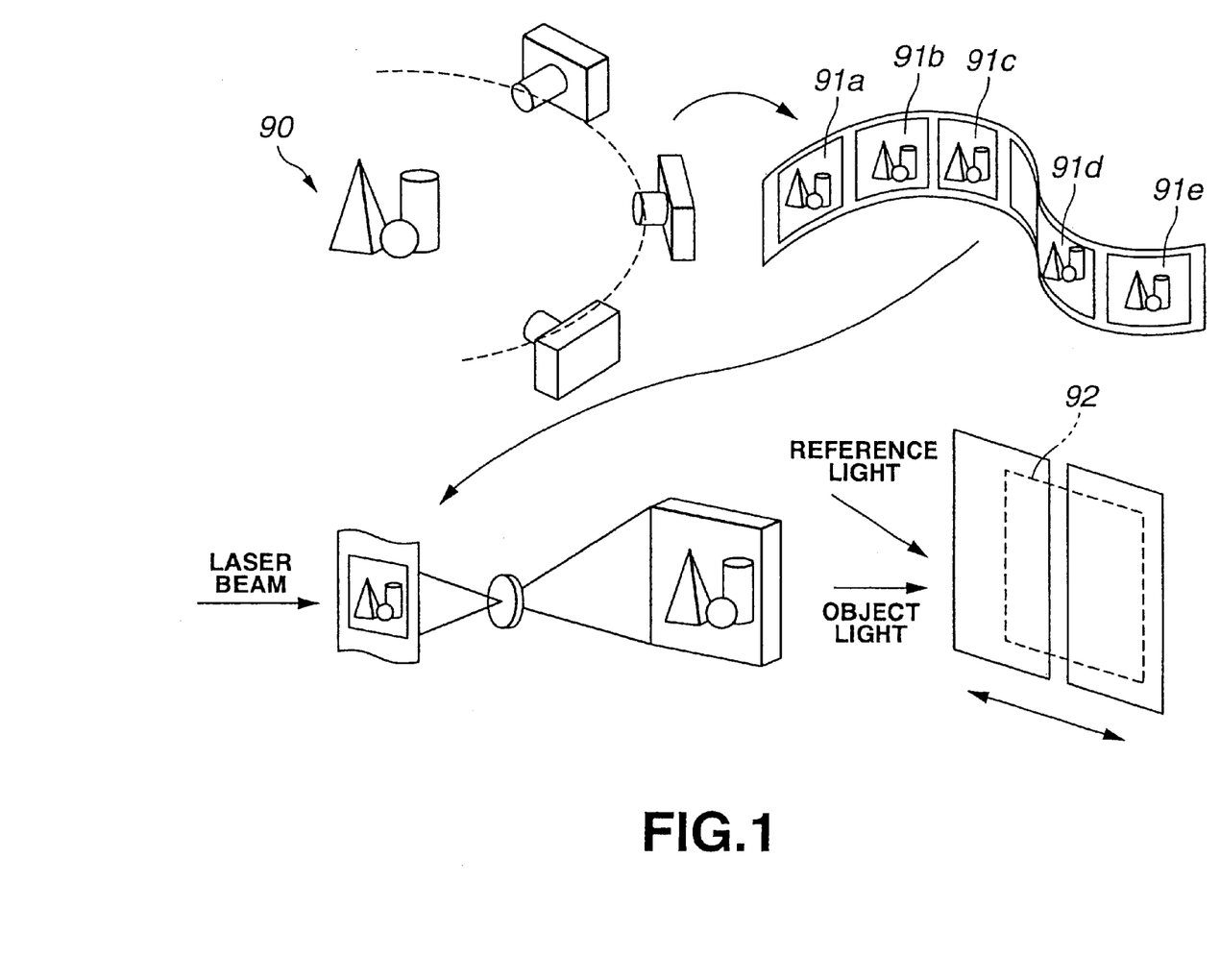
FIG. 1 illustrates how to create a holographic stereogram.

For example, FIG. 1 shows a holographic stereogram having parallax information in a cross direction only. A subject 90 is sequentially photographed crosswise from different observation points to generate a plurality of original pictures 91a to 91e. An image recording apparatus sequentially records these original pictures as element holograms in strips on a holographic recording medium 92.

Image information is obtained by sequentially photographing from different observation points along a cross direction and is sequentially recorded crosswise as element holograms in strips. When an observer views this holographic stereogram with both eyes, right and left eyes accept slightly different 2-D images respectively. This causes the observer to feel parallax, reproducing a 3-D image.

Figure 2A:
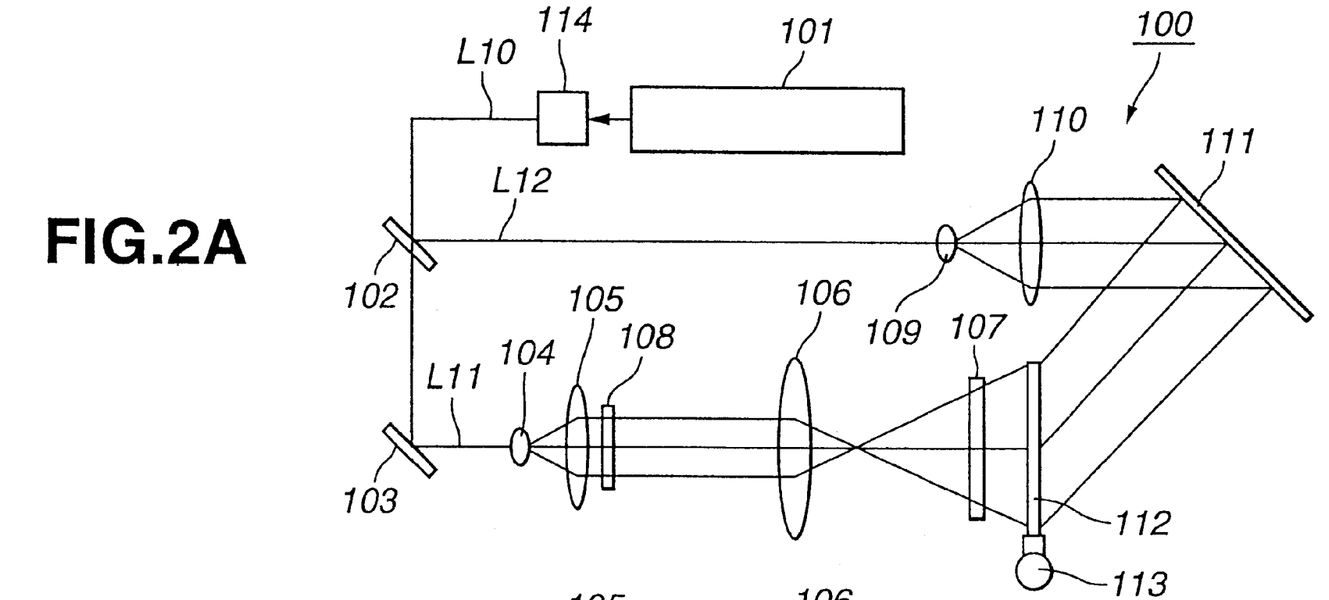
FIG. 2 schematically shows an optical system for a conventional holographic stereogram creation apparatus.
Figure 2B:
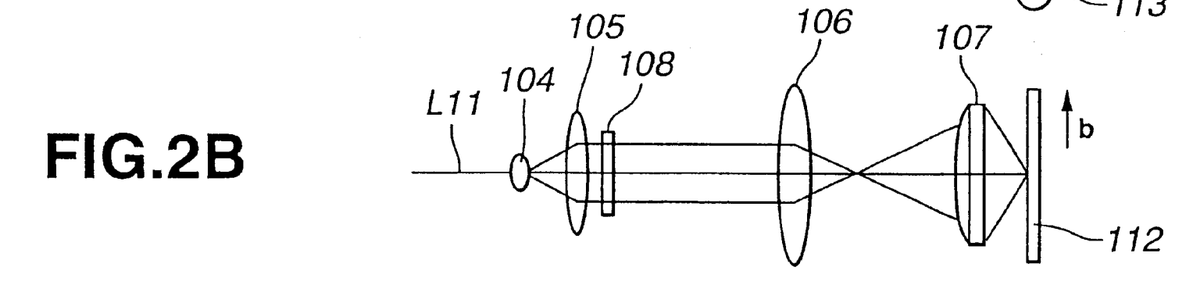

FIG. 2 shows a configuration example of a printer for creating such a holographic stereogram (hereafter referred to as a holographic stereogram printer). FIG. 2(A) is atop view of an entire optical system for a holographic stereogram printer 100. FIG. 2(B) is a side view of an object light portion of the optical system.

The holographic stereogram printer 100 captures many image data elements by crosswise photographing a real object from different observation points. Processed image data includes rendering images such as a plurality of CAD (Computer Aided Design) or CG (Computer Graphics) images created by sequentially providing parallaxes crosswise. Based on the processed image data, the holographic stereogram printer 100 drives an LCD (Liquid Crystal Display). 109. Each image data is sequentially recorded as a hologram strip on a holographic recording medium 112 for creating a holographic stereogram.

Actually, in this holographic stereogram printer 100, a separately provided system control section drives an LCD 108 based on one of a plurality of generated image data. The LCD 108 displays an image based on the image data. At this time, the system control section sends a control signal to a shutter 114 to open it. A laser beam L10 generated from a laser light source 101 enters a spatial filter 104 via the shutter 114, a half mirror 102, and a mirror 103, sequentially.

This laser beam L11 is enlarged by the spatial filter 104 and a collimator lens 105. The beam is transmitted through the LCD 108 and is converted to projection light corresponding to an image displayed on the LCD 108. The beam then enters a cylindrical lens 107 via a condensing lens 106. The beam is crosswise condensed by the cylindrical lens 107 and then enters a holographic recording medium 112 mounted on an electric stage 113.

When the laser beam is applied to the holographic recording medium 112, the laser beam L12 reflected on the half mirror 102 is transmitted through the cylindrical lens 109, the collimator lens 110, and a mirror 111 in order. As reference light, the laser beam enters at a specified angle from the rear side of the holographic recording medium 112. In this case, the optical path length of the reference light is specified so that it becomes approximately the same as the optical path length of a laser beam (hereafter referred to as an object light) which passes the half mirror 102 and then the mirror 103 and enters the holographic recording medium 112.

The holographic stereogram printer 100 can let the object light (projection light) and the reference light interfere with each other on a recording surface of the holographic recording medium 112. Consequently, an image displayed on the LCD 108 can be recorded as an interference pattern in strips on the holographic recording medium 112.

When the image has been recorded in this holographic stereogram printer 100 thereafter, the system control section drives the shutter 114 to block the laser beam L10 generated from the laser light source 101. The LCD 108 is also stopped. Under control of the system control section, the electric stage 113 is driven to feed the holographic recording medium 112 for the width of one hologram strip in the direction of an arrow b.

Under control of the system control section thereafter, the LCD 108 is driven to display an image based on the succeeding image data: Then, the system control section opens the shutter 114 to record the image displayed on the LCD 108 onto the holographic recording medium 112. After that, the operation is repeated successively.

Hence, the holographic stereogram printer 100 can successively record images in strips onto the holographic recording medium 112 based on image data in a supplied parallax image sequence. This can provide a desired holographic stereogram.

The above-mentioned holographic stereogram printer needs a means for holding and transferring a holographic recording medium. Such means must completely fix the holographic recording medium during exposure, cause no vibration as small as a wavelength, fast transfer the medium and leave no vibration after a stop. However, it takes approximately 2 seconds for the electric stage 113 of the holographic stereogram printer 100 until a vibration attenuates after the transfer. When this electric stage 103 is used to transfer the medium each time a hologram strip is formed, it will take a very long time until one holographic stereogram is completed.

An examination was conducted concerning the holding and transfer means capable of suppressing the vibration of the holographic recording medium. Instead of the above-mentioned electric stage 113, a method has been devised to load a long holographic recording medium between two parallel rollers, use a torsion coil spring or the like to provide a given tension for support, and irradiate object light by pressing optical parts against a bridge between the two parallel rollers. This configuration can decrease the time for attenuating the vibration after the transfer to a quarter or less. However, there is a problem of complicating the mechanism for allowing the torsion coil spring to stably generate a given force.

As with a conventional printer or printing apparatus, it is possible to generate easily a given torque without using a torsion coil spring by always rotating a slip material reversely and transmitting a motor drive to one of the parallel rollers. Since the motor rotates even during exposure of the hologram, this rotation generates an unnecessary vibration, deteriorating the image quality.

Applying an excess tension to such a film material in the longer direction easily ripples the film surface and prevents the film from being parallelized. This caused an image to be distorted or to lose uniformity.

When a holding method is used to cause a large stress difference between the longer and shorter directions, double refraction occurs on a base filth or a cover film. This also could cause image deterioration. When the medium is pressed against a glass, a dust particle enters to lift the exposed portion. This also ripples the film and gives a disadvantageous effect on the image.

BRIEF SUMMARY OF THE INVENTION

It is an object of the present invention to provide an image recording apparatus which can simply and reliably prevent a holographic recording medium from vibrating. It also is an object of the present invention to provide a holographic recording medium cartridge which can protect the holographic recording medium against external dust and the like.

For solving the above problems, an image recording apparatus according to the present invention irradiates object light to one side of a holographic recording medium and reference light to the other side thereof and successively records each image in a parallax image sequence as an element hologram on the holographic recording medium, comprising: transfer means for transferring the holographic recording medium; and medium retaining means for retaining an exposure portion vicinity of the holographic recording medium transferred by the transfer means by using two members each having a cutout for transmitting the object light or the reference light.

In this image recording apparatus, the medium retaining means holds the holographic recording medium in the thickness direction near the exposure portion. For doing so, the medium retaining means uses a contact member touching the holographic recording medium and a presser plate member letting the holographic recording medium closely contact with this contact member. Accordingly, it is possible to suppress vibration generated on the holographic recording medium during exposure.

For solving the above problems, a holographic recording medium cartridge attached to an image recording apparatus uses a holographic recording medium to record sequentially, as an element hologram, an interference pattern generated from an object light processed by image modulation based on each image in a parallax image sequence and a reference light having coherence to this object light. The cartridge integrates a shading container winding the continuous holographic recording medium round a rotatively contained shaft and shading external light; and medium retaining means for retaining an exposure portion vicinity of the holographic recording medium pulled out of a feeding opening in the shading container by using two members each having a cutout for transmitting the object light or the reference light.

This holographic recording medium cartridge can prevent the holographic recording medium from being exposed outward up to the medium retaining means and protect it against external dust and the like.

As will be clearly understood from the above description, the image recording apparatus according to the present invention can sufficiently suppress vibration during a recording operation on a holographic recording medium. This enables accurate recording and improves diffraction efficiency during reproduction, generating a bright and clear holographic stereogram. The film flatness is maintained well, preventing an image from being distorted.

It is possible to greatly reduce wait time until the vibration attenuates after the holographic recording medium is transferred. Accordingly, it is possible to greatly shorten process tune when the holographic recording medium is transferred for creating a holographic stereogram each time one hologram strip is recorded.

The holographic recording medium cartridge according to the present invention improves maintainability and prevents lifting and image quality degradation due to a dust particle entered between the holographic recording medium and a contact member.

DETAILED DESCRIPTION OF THE INVENTION

Embodiments of the present invention will be described in further detail with reference to the accompanying drawings. The present invention is not limited to the following examples. It is further understood by those skilled in the art that various changes and modifications may be made in the present invention without departing from the spirit and scope thereof.

Figure 3:
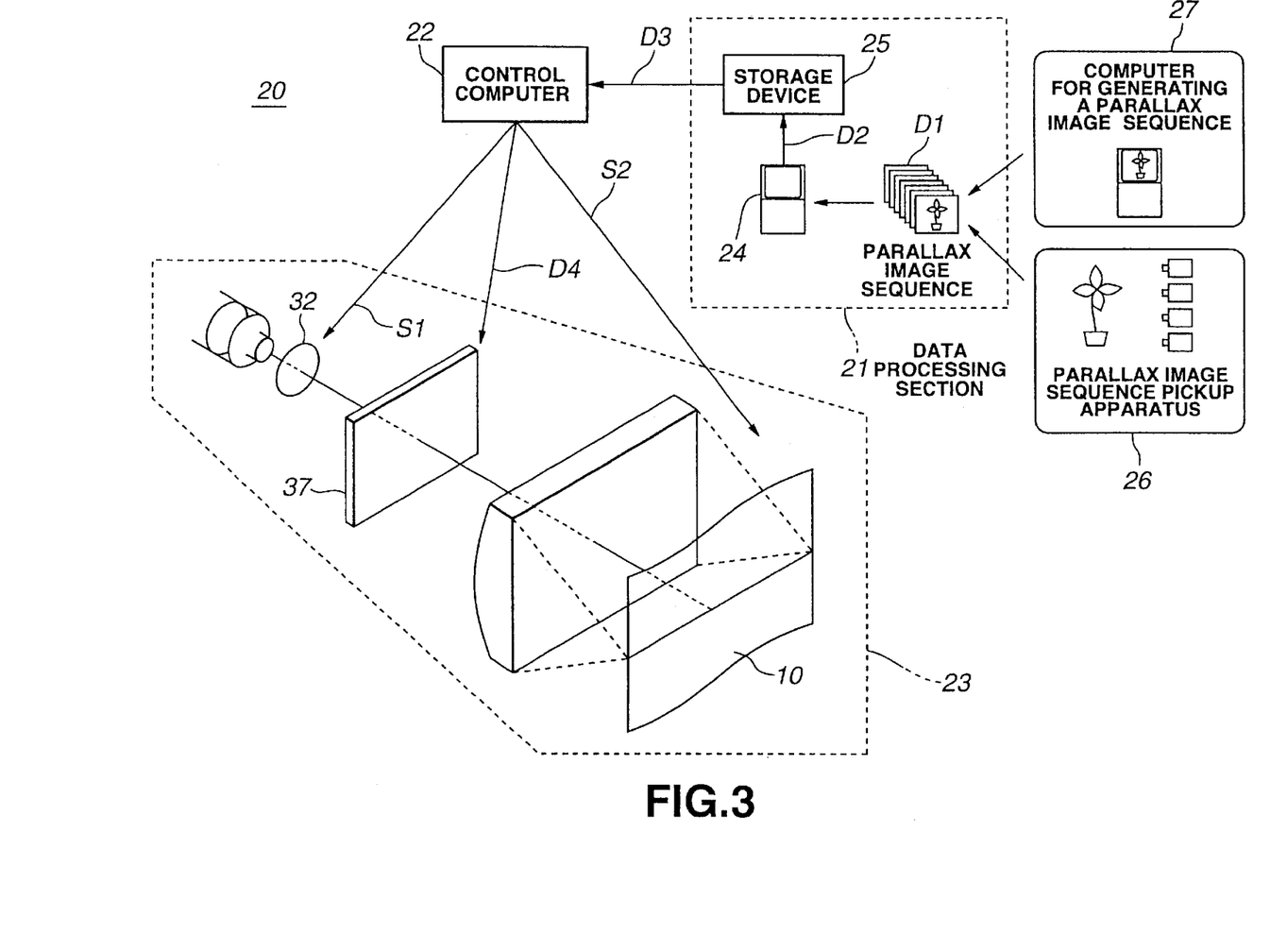
FIG. 3 shows a configuration example of a holographic stereogram printer system.

First, the following provides an outline of a holographic stereogram printer system to which the present invention is applied. FIG. 3 shows a configuration of a holographic stereogram printer system 20.

The holographic stereogram printer system 20 comprises a data processing section 21, a control computer 22, and a holographic stereogram printer 23.

A parallax image sequence pickup apparatus 26 outputs image data for a plurality of images. These images are generated by crosswise photographing a real object from a plurality of observation points. To generate these images, for example, a multi-lens camera is used to photograph a plurality of pictures at a time. Alternatively, a mobile camera is used to photograph a plurality of pictures successively. As another method, a computer 27 outputs image data by creating a plurality of rendering images by crosswise providing parallaxes successively. Based on the above-mentioned image data, the data processing section 21 generates a parallax image sequence D1. An image processor 24 applies specified hologram image processing to respective image data in the parallax image sequence D1 and generates hologram image data D2. The data is temporarily stored in a storage device 25 such as memory or a hard disc.

During a succeeding exposure operation, the data processing section 21 sequentially reads image data from tie parallax image sequence stored in the storage device 25. The data processing section 21 sequentially sends the read image data D3 to the control computer 22.

During the exposure operation, the control computer 22 provides control to drive a shutter 32, an LCD 37, a printer head (not shown), and the like in the holographic stereogram printer 23 based on each image data D3 in the parallax image sequence supplied from the data processing section 21.

Figure 4A:
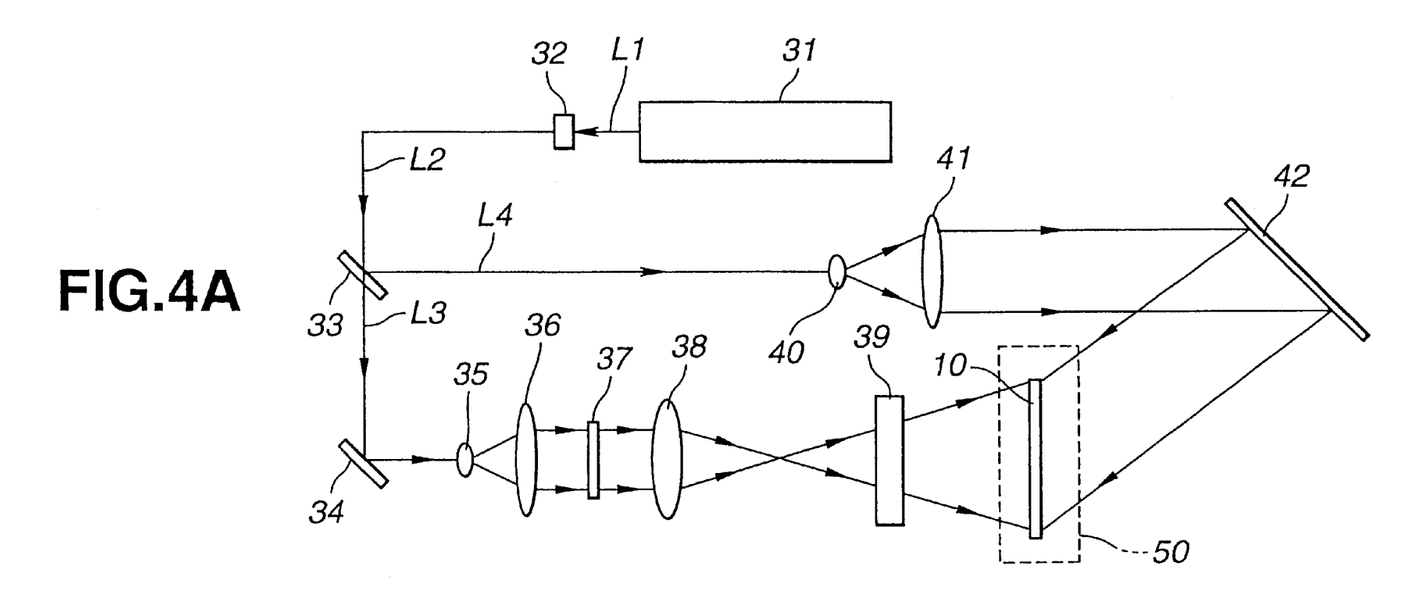
FIG. 4 shows an example of an optical system for a holographic stereogram printer.
Figure 4B:
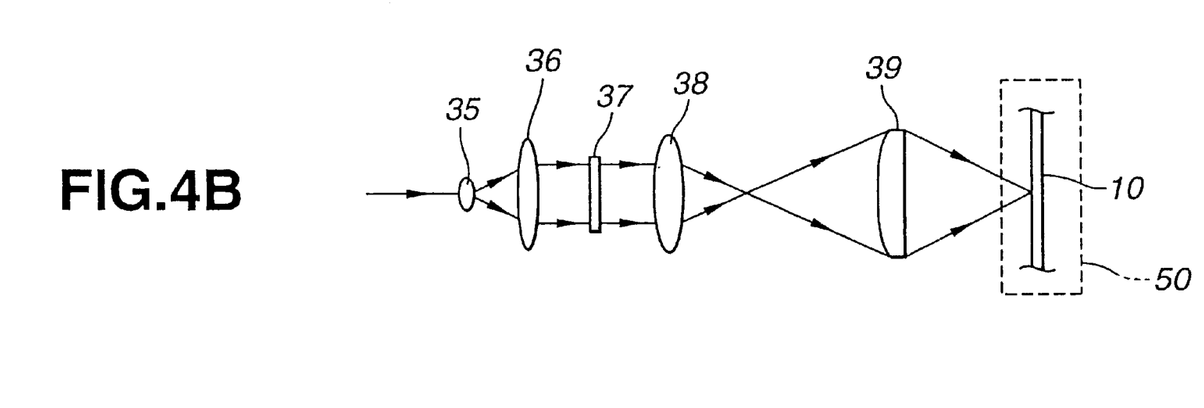

FIG. 4 shows a configuration of the holographic stereogram printer 23. The mutually corresponding parts in FIGS. 3 and 4 are designated by the same reference numerals. FIG. 4(A) is a top view of the entire optical system for the holographic stereogram printer 23. FIG. 4(B) is a side view of an object light portion in the optical system for the holographic stereogram printer 23. The holographic stereogram printer 23 drives the LCD 37 based on the image data D4 supplied from the control computer 22. Based on the image data D4, respective images are sequentially recorded as hologram strips on the holographic recording medium 10 to create a holographic stereogram.

More specifically, the holographic stereogram printer drives the LCD 37 based on one piece of image data D4 supplied from the control computer 22. The LCD 37 displays an image based on the image data D4. At the same time, the control computer 22 sends a control signal S1 to the shutter 32 to open it. When the shutter opens, a laser beam L1 from a laser light source 31 passes a shutter 32, a half mirror 33, and a mirror 34, and then enters a spatial filter 35.

This laser beam is enlarged by the spatial filter 35 and a collimator lens 36. After being transmitted through the LCD 37, the beam is converted to the projection light corresponding to the image displayed on the LCD 37. The beam enters a cylindrical lens 39 via a condensing lens 38. The beam is crosswise compressed by the cylindrical lens 39. Then, the beam is irradiated to the holographic recording medium 10 mounted on the printer head 50.

When the laser beam is applied to the holographic recording medium 10, the laser beam reflected on the half mirror 33 is transmitted through the cylindrical lens 40, the collimator lens 41, and a mirror 42 in order. As reference light L4, the laser beam enters at a specified angle from the rear side of the holographic recording medium 10. In this case, the optical path length of the reference light L4 is specified so that it becomes approximately the same as the optical path length of a laser beam L3 (hereafter referred to as an object light) which passes the half mirror 33 and then the mirror 34 and enters the holographic recording medium 10.

The holographic stereogram printer 23 can let the object light (projection light) L3 and the reference light L4 interfere with each other on a recording surface of the holographic recording medium 10. Consequently, an image displayed on the LCD 37 can be recorded as an interference pattern in strips on the holographic recording medium 10.

When the image has been recorded in this holographic stereogram printer 23 thereafter, the control computer 22 drives the shutter 32 to block the laser beam L1 generated from the laser light source 31. The LCD 37 also is stopped. Under control of the control computer 22, the printer head 50 is driven to feed the holographic recording medium 10 for the width of one hologram strip.

Under control of the control computer 22 thereafter, the LCD 37 is driven to display an image based on the succeeding image data D4. Then, the control computer 22 provides control to open the shutter 32 to record the image displayed on the LCD 37 onto the holographic recording medium 10. After that, the operation is repeated successively.

Hence, the holographic stereogram printer 23 can successively record images in strips onto the holographic recording medium 10 based on image data in a supplied parallax image sequence. This can provide a desired holographic stereogram.

Described below is the holographic recording medium 10 used for the holographic stereogram printer system.

Figure 5:
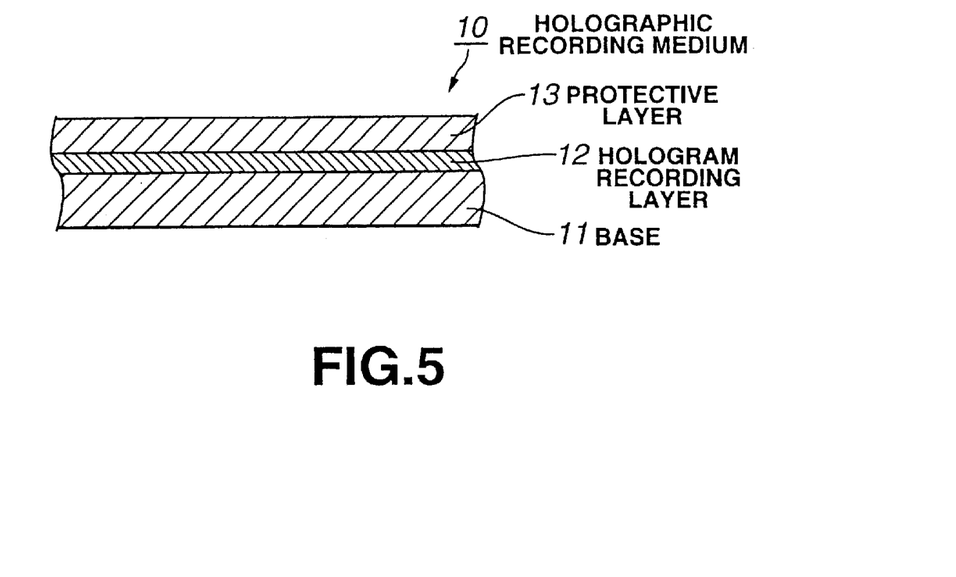
FIG. 5 is a sectional view of an example of a holographic recording medium.

The holographic recording medium 10 comprises a tape-shaped base 11 on which a photopolymer hologram recording layer 12 is formed. Further, a protective layer 13 is applied to the hologram recording layer 12 to, form a so-called film-applied recording medium. The photosensitive hologram recording layer 12 according to the embodiment is manufactured by DuPont under the product name OMNI-DEX. Under an unexposed condition, the refractive index is 1.487. The film thickness is approximately 20 $\mu$m.

Figure 6A:
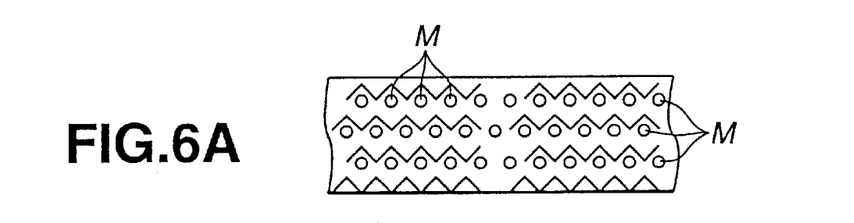
FIG. 6 shows a sensitization process for photopolymer.
Figure 6B:
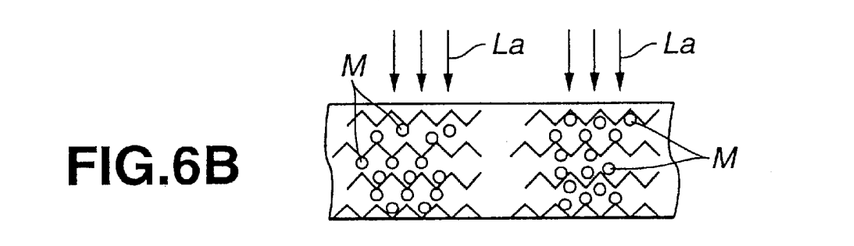
Figure 6C:
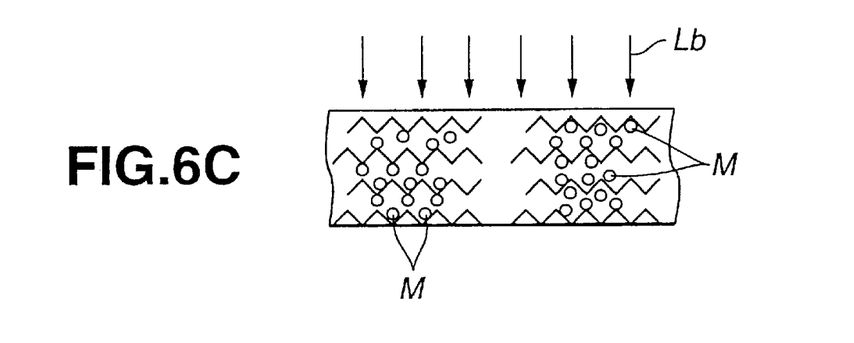

As shown in FIG. 6(A), monomer M initially disperses in the matrix polymer evenly. As shown in FIG. 6(B), by contrast, the monomer M is polymerized at exposed locations when light La with the power of approximately 10 to 400 mJ/cm$^2$ is irradiated. As the polymerization proceeds, the monomer M moves from the circumference to change the densities of the monomer M depending on locations, thus causing refractive index modulation. Thereafter, as shown in FIG. 6(C), ultraviolet or visible light Lb with the power of approximately 1,000 mJ/cm$^2$ is irradiated to the entire surface to complete polymerization of the monomer M. As mentioned above, the refractive index for photopolymer varies with incident light. It is possible to record an interference pattern due to interference between the reference light and the object light as refractive index variations.

The holographic recording medium 10 using such photopolymer requires no special development after the exposure. A simplified configuration is available for the holographic stereogram printer 23 provided with the holographic recording medium 10, which employs the photopolymer for exposed portions.

In the holographic stereogram printer 23, it may be preferable to provide, for example, a one-dimensional diffuser panel (not shown)just in front of the holographic recording medium 10 along an optical path for the object light. In this configuration, the cylindrical lens 39 of the object light optical system crosswise converges light which then is transmitted through the one-dimensional diffuser panel. The light is then one-dimensionally diffused in the longer direction of the strip-form element hologram and is irradiated to the holographic recording medium 10. When the holographic stereogram printer 23 is configured like this, the holographic stereogram to be created can sufficiently ensure an angle of field in the longitudinal direction.

Figure 7:
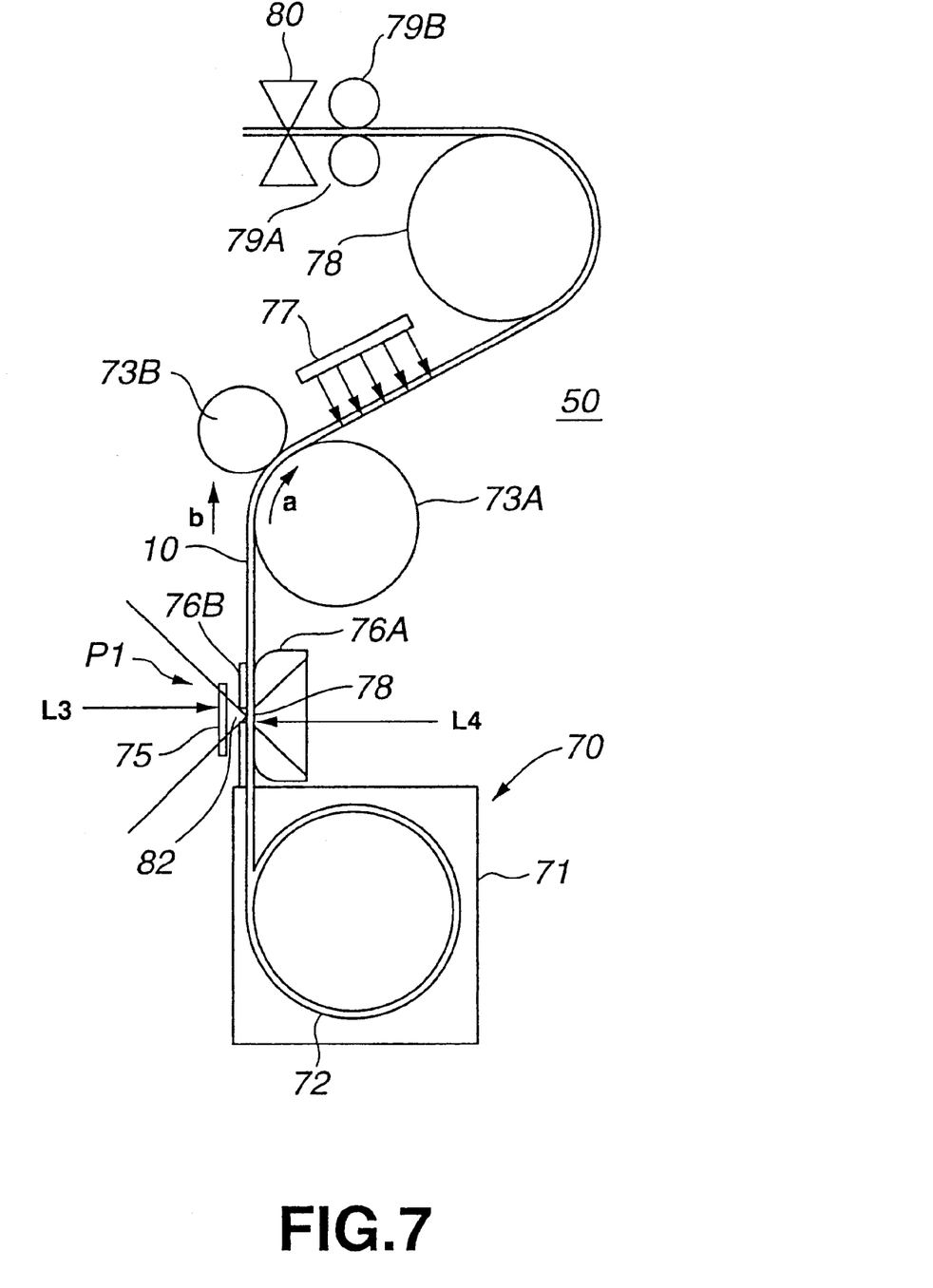
FIG. 7 shows a configuration example in the vicinity of a printer head.

While the holographic stereogram printer 23 exposes the holographic recording medium 10, the medium is placed in a cartridge container 71, as shown in FIG. 7. The medium is mounted as a film cartridge 70 on the printer head 50, which operates under control of the control computer 22.

The printer head 50 holds and transfers the holographic recording medium 10. A shaft is used to rotatively support a roller 72 in the film cartridge 70 mounted on a specified position. The holographic recording medium 10 pulled out of the film cartridge 70 is held between a pair of intermittent feed rollers 73A and 73B. This mechanism allows the holographic recording medium 10 to be placed at a specified exposure position perpendicular to an object light axis.

Figures 8, 9:
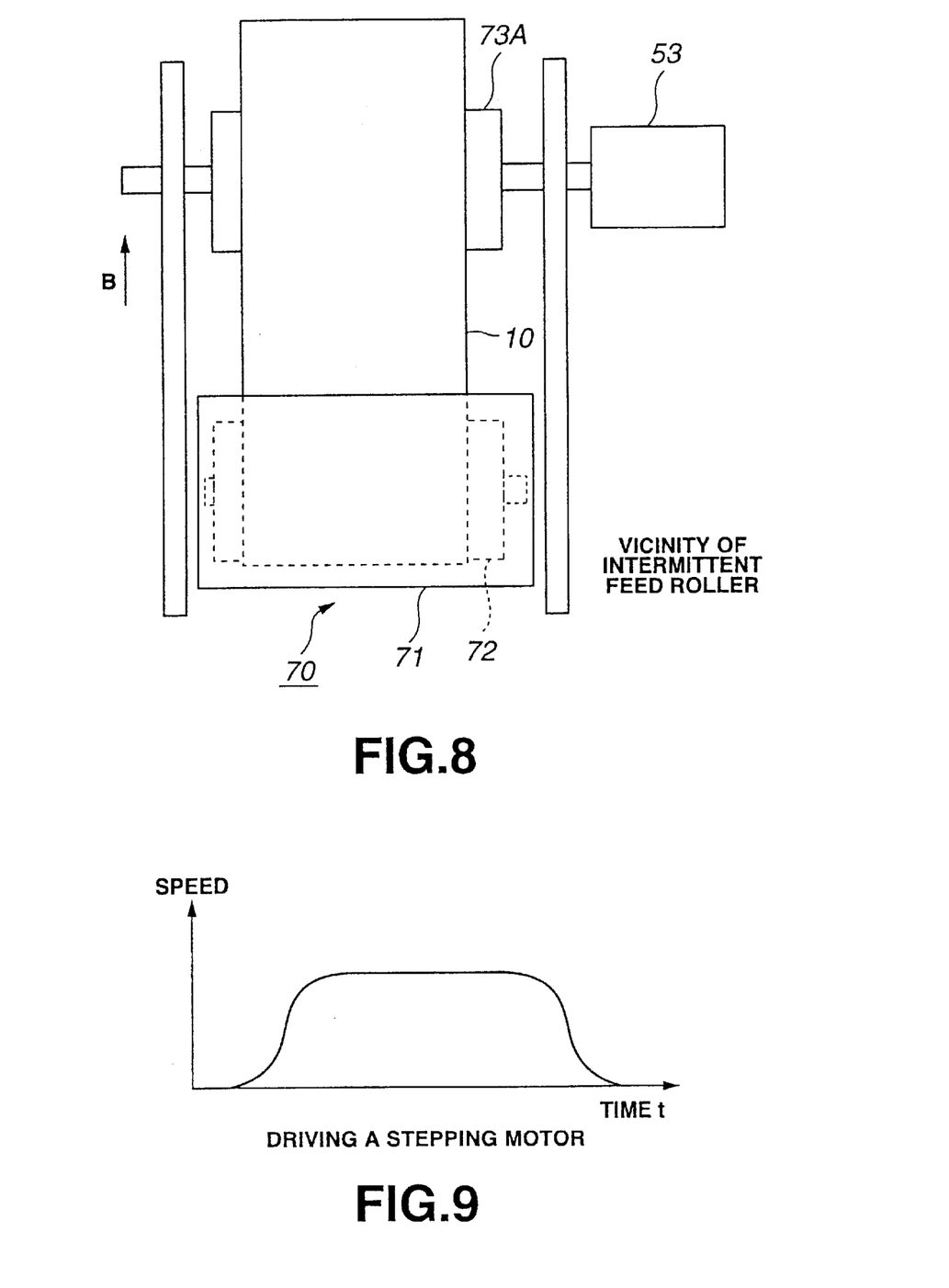
FIG. 8 is an enlarged view in the vicinity of an intermittent feed roller for the printer head.
FIG. 9 explains an adjustable speed drive of a stepping motor.

Of the pair of intermittent feed rollers 73A and 73B, the intermittent feed roller 73A is directly connected to a stepping motor 53, as shown in FIG. 8. The stepping motor 53 is controlled by the control computer 22. Based on a control signal supplied from the control computer 22, the stepping motor rotatively drives the intermittent feed roller 73A each time one element hologram has been exposed. The roller is driven intermittently at a specified angle in the direction of the arrow "a" in FIG. 7. Accordingly, the holographic recording medium 10 held between the pair of intermittent feed rollers 73A and 73B is advanced intermittently for the element hologram width in the direction of the arrow "b" each time one element hologram has been exposed.

A contact member (slit head) 76A is provided prior to a pair of intermittent feed rollers 73A and 73B near an exposure position P1 on the side of the reference light L4. The slit head is made of a rigid body, such as magnetic iron, and is provided with a slit 78. The holographic recording medium 10 touches the slit head 76A. The reference light L4 is transmitted through the slit 78 of the slit head 76A. In addition to magnetic iron, stainless steel and the like can be used for the slit head 76A.

On the side of the object light L3 at the exposure position P1, a presser plate member 76B is provided for pressing the holographic recording medium 10 against the slit head 76A. The presser plate member 76B also is provided with a slit 82 and is placed in accordance with the incident position of the object light L3. A magnetic member is used for the presser plate member 76B.

The slit head 76A and the presser plate member 76B constitute a medium retaining section 76. When the holographic recording medium 10 is transferred by the roller 72 and the intermittent feed rollers 73A and 73B, the medium retaining section retains this medium near the exposure position P1. The medium retaining section is positioned opposite the thickness direction.

By using the medium retaining section 76, the holographic stereogram printer 23 can suppress the fine vibration of the holographic recording medium 10 generated between the roller 72 and the pair of intermittent feed rollers 73A and 73B. Accordingly, the holographic stereogram printer 23 having the printer head 50 can generate a holographic stereogram with high brightness, namely large diffraction efficiency.

The film flatness is maintained well, hardly causing an image to be distorted.

It is possible to shorten the distance between the pair of intermittent feed rollers 73A and 73B for a film and the medium retaining section 76 as a vibration suppress section. It also is possible to shorten the wait time for attenuation of the extended film.

A pair of intermittent feed rollers 73A and 73B can freely rotate in the direction of the arrow "a" based on a rotation force supplied from the stepping motor 53. The stepping motor 53 is controlled by the control signal S2 supplied from the control computer 22 and successively rotates a pair of intermittent feed rollers 73A and 73B at a specified angle each time one image has been exposed. Accordingly, the holographic recording medium 10 can be advanced for one hologram strip.

Here, the presser plate member 76B is set toward the holographic recording medium 10 with a given force near the exposure position P1, preventing the holographic recording medium 10 from overrunning excessively.

When this set force is proper, a good condition is maintained during an intermittent feed and a steadily pressed state. No overrun occurs while the film is fed. The holographic recording medium 10 can be exposed with a close contact with the slit head 76A.

Experimentally, the stepping motor 53 is driven at a constant speed and then is stopped. After a vibration is attenuated, the exposure process shows almost as good a result. The overrun is completely eliminated to stabilize an operation by driving the stepping motor 53 at an adjustable speed according to a S-shaped curve as shown in FIG. 9. This adjustable speed drive contributes to suppressing the vibration of the entire system, thus reducing the wait time for vibration attenuation for the exposure process down to approximately one third.

Described below is processing in the printer bead 50 after the exposure process.

An ultraviolet lamp 77 is provided along the path for the holographic recording medium 10 posterior to a pair of intermittent feed rollers 73A and 73B. This lamp can irradiate an ultraviolet ray with a specified power to an exposure portion on the holographic recording medium 10 fed by a pair of intermittent feed rollers 73A and 73B. The ultraviolet ray completes the diffusion of monomer M.

There are provided a heat roller 78 freely pivoting on a shaft, a pair of eject feed rollers 79A and 79B, and a cutter 80 in order along the path for the holographic recording medium 10 posterior to the ultraviolet lamp 77. The eject feed rollers 79A and 79B are placed so that the holographic recording medium 10 is wound half around the heat roller 78.

The heat roller 78 contains heating means (not shown), such as a heater, so that the peripheral surface is kept at approximately 120° C.

This setting is based on our experiment. Namely, a heating plate is temperature-controlled to be kept at a constant temperature of 120° C. A glass plate is a pressed from the upper side with a spring force. The exposed photopolymer (OMNI-DEX) is sandwiched between the heating plate and the glass plate and is heated for five minutes. The process results in almost the same refractive index modulation as that for heating at 120° C. in an atmosphere for two hours. Our experiment ensured this.

The outer diameter of the heat roller 78 is so determined that it takes enough of a time interval to fix a recording image from the time the holographic recording medium 10 begins touching the heat roller's peripheral surface until it leaves the surface. This configuration can reliably fix an image recorded on the holographic recording medium 10 which passes the heat roller 78.

Although not shown, a drive mechanism is used for the eject feed rollers 79A and 79B. It is hereafter referred to as the eject feed roller drive mechanism. When the holographic recording medium 10 is fed intermittently, this drive mechanism rotates the eject feed rollers 79A and 79B synchronously with the intermittent feed rollers 73A and 73B based on the control signal S2 output from the control computer 22. This reliably keeps the holographic recording medium 10 in contact with the peripheral surface of the heat roller 78 between a set of intermittent feed rollers 73A and 73B and a set of eject feed rollers 79A and 79B without the slack.

Although not shown, a drive mechanism is used for the cutter 80. It is hereafter referred to as the cutter drive mechanism. After a given image is recorded on the holographic recording medium 10, the cutter drive mechanism operates based on the control signal S2 supplied from the control computer 22. Namely, a portion of the holographic recording medium 10 contains a complete set of recorded images. When this portion is ejected out of the cutter 80, the drive mechanism operates the cutter 80 to separate this portion from the remaining portion, This can outward eject a portion of the holographic recording medium 10 where images are recorded as a single holographic stereogram.

While there hag been described the preferred embodiment of the image recording apparatus according to the present invention, it is to be distinctly understood that the present invention is not limited thereto.

For example, the slit head 76A in FIG. 7 may be a permanently magnetized member. The presser plate member 76B may be magnetic stainless steel. Both may be permanently magnetized. Namely, the slit head 76A and/or the presser plate member 76B is formed of a magnetic material.

It may be preferable to embed an electromagnet (not shown) in the slit head 76A so that a magnetic force is generated always or as needed for stabilizing a film.

It may be preferable to use an electrostatic force for pulling the holographic recording medium 10 toward the slit head 76A, A similar effect can be expected by thinning and lightening the presser plate member 76B and applying an electric field between this member and the slit head 76A.

Figure 10:
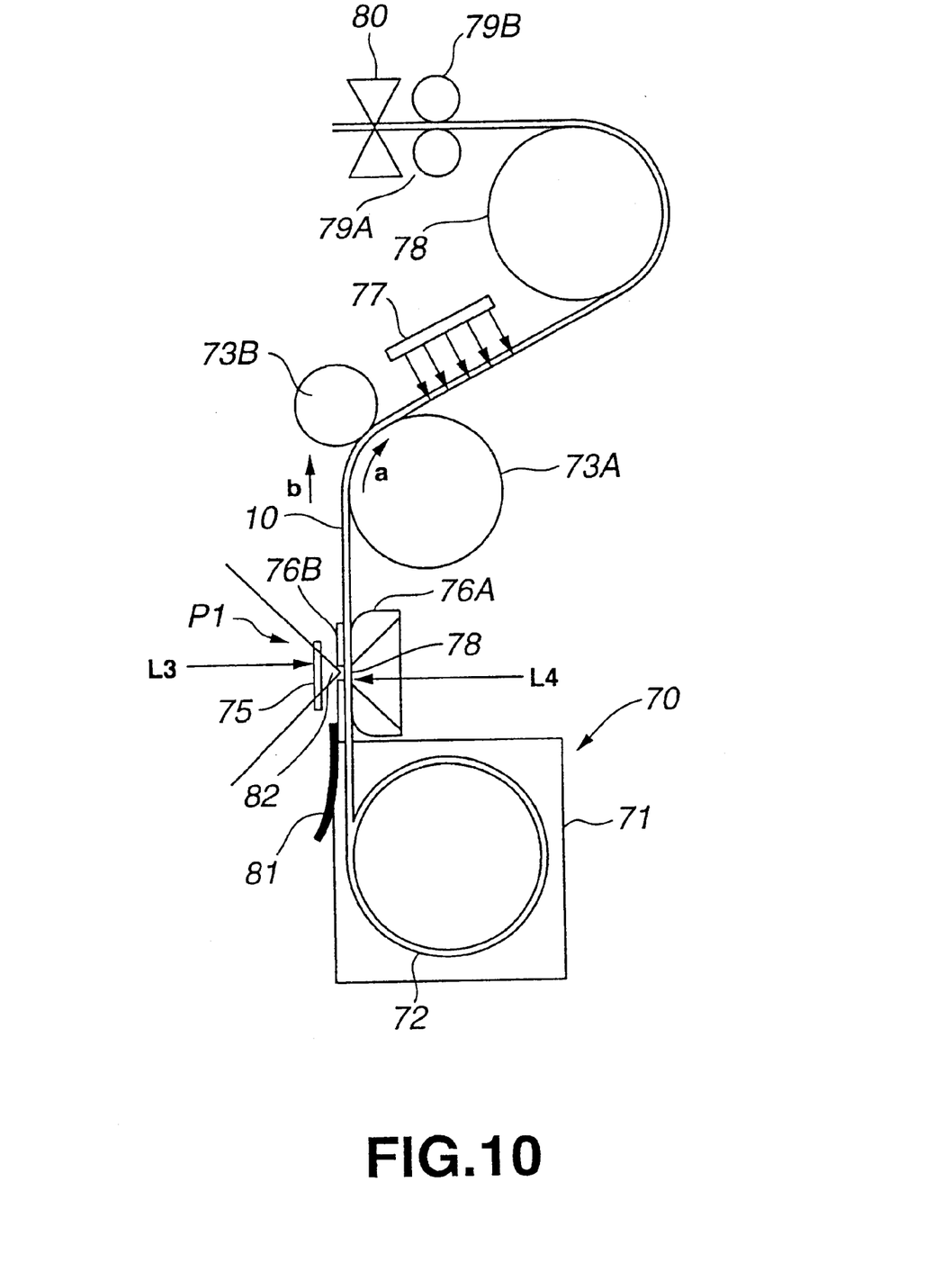
FIG. 10 shows another configuration example in the vicinity of a printer head.

FIG. 10 shows an equivalent configuration. In this configuration, a fixed plate spring 81 is used for applying a force toward the slit head 76A without magnetizing the presser plate member 76B.

The following describes another embodiment of the holographic recording medium cartridge which is mounted on the holographic stereogram printer 23 in FIG. 7 having the printer head 50.

Figure 11:
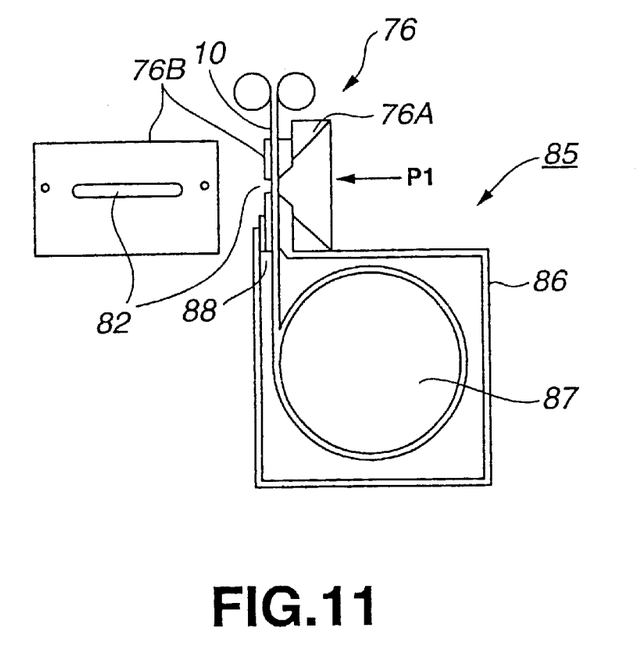
FIG. 11 shows an example of a holographic recording medium cartridge.

Another embodiment is a holographic recording medium cartridge 85 by integrating the medium retaining section 76 with a cartridge container. As shown in FIG. 11, the holographic recording medium cartridge 85 comprises a shading cartridge container 86, a roller 87, and the medium retaining section 76. The shading cartridge container 86 shades the light. The roller 87 is rotatively supported in the shading cartridge container 86. The holographic recording medium 10 is wound round the roller 87. The medium retaining section 76 is integrated with the shading cartridge container 86. The container 86 is provided with a feed opening 88. The exposure position vicinity P1 is located on the holographic recording medium 10 after it is fed out of the feed opening 88. The medium retaining section 76 retains the medium between two members provided opposite the thickness direction of the holographic recording medium 10. The slit head 76A is included in the medium retaining section 76 and is integrated with the shading cartridge container 86 via a spacer 76C. This spacer positions the slit head 76A to the exposure position vicinity P1.

Since the medium retaining section 76 is integrated with the shading cartridge container 86, the holographic recording medium 10, when fed out of the feed opening 88, is not exposed externally until the medium moves to the exposure portion vicinity. In other words, integration of the medium retaining section 76 with the shading cartridge container 86 prevents inclusion of dust into an unexposed material inside the cartridge that is assembled in a clean room. Accordingly, it is possible to prevent a dust particle from entering between the holographic recording medium 10 and the slit head 76A for degrading the image quality due to lifting. Further, the medium retaining section 76 can be easily set up just by mounting the holographic recording medium cartridge on the printer head 50.

Figure 12:
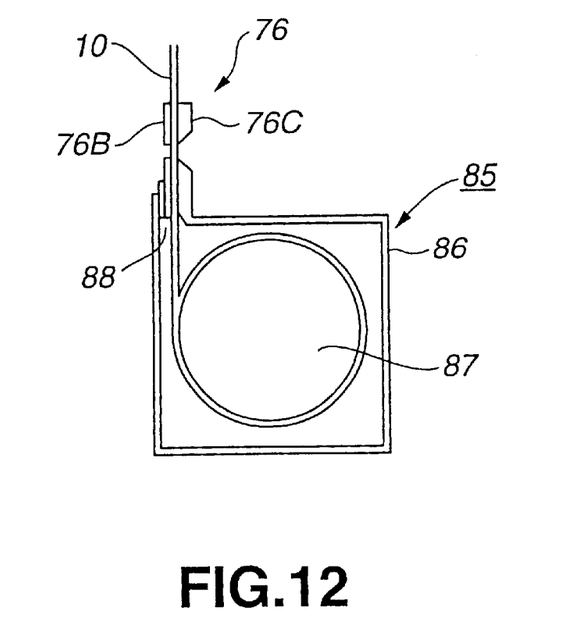
FIG. 12 shows another example of a holographic recording medium cartridge.

As shown in FIG. 12, it may be preferable to configure the shading cartridge container 86 just by integrating the presser plate member 76B with the spacer 76C for aligning the slit head 76A to the exposure portion vicinity without integrating the slit head 76A. In this case, the holographic recording medium cartridge 85 is first mounted on the printer head 50. Then, the slit head 76A is attached to the spacer 76C. The spacer 76C prevents the holographic recording medium 10 from being exposed up to the exposure position vicinity P1, eliminating inclusion of dust into an unexposed material inside the cartridge that is assembled in a clean room. It also is possible to prevent a dust particle from entering between the holographic recording medium 10 and the slit head 76A for degrading the image quality due to lifting.

In the above-mentioned embodiments, the present invention is applied to creation of a holographic stereogram having parallax information only in the cross direction, but it is not limited thereto. The present invention can be applied to creation of a holographic stereogram having parallax information only in the longitudinal direction or in the cross and longitudinal directions.

While the above-mentioned embodiments have explained creation of a monochrome holographic stereogram, the present invention also is applicable to creation of a color holographic stereogram. In this case, it is just necessary to use three light beams corresponding to three primary colors of light. For reproducing a color holographic stereogram recorded with three light beans corresponding to three primary colors of light, an image reproduction apparatus is provided with three light sources for generating the three primary colors. Beams from the respective light sources are irradiated as the reproduction illumination light. When a plurality of light sources is used, the optical system needs to be configured so that beams from the respective light sources become parallel to each other. When a color holographic stereogram is reproduced, the transmission hologram is characterized by low wavelength selectivity during reproduction. It is desirable to use a light source with high color purity. This makes it possible to clearly reproduce a color holographic stereogram for the transmission hologram.

Other modifications can be made, including the incident direction of the reference light in the holographic stereogram printer, the number of lenses, types and combinations thereof, and are not limited to those in the above embodiments.

What is claimed is:

1. An image recording apparatus for irradiating object light to one side of a holographic recording medium and reference light to the other side thereof and successively recording each image in a parallax image sequence as an element hologram on said holographic recording medium, comprising:

transfer means for transferring said holographic recording medium; and medium retaining means for retaining an exposure portion vicinity of said holographic recording medium transferred by said transfer means by using two members each having a cutout for transmitting said object light or said reference light.

2. The image recording apparatus according to claim 1, wherein said medium retaining means retains said holographic recording medium by providing a contact member touching said holographic recording medium and a presser plate member for letting said holographic recording medium closely contact with this contact member along a thickness direction of said holographic recording medium.

3. The image recording apparatus according to claim 2, wherein said presser either or both of said contact member and said presser plate member is made of a magnetic material.

4. The image recording apparatus according to claim 2, wherein said presser plate member is forced toward said contact member by an elastic member.

5. A holographic recording medium cartridge attached to an image recording apparatus which uses a holographic recording medium to sequentially record, as an element hologram, an interference pattern generated from an object light processed by image modulation based on each image in a parallax image sequence and a reference light having coherence to this object light, comprising:

an integrated shading container and medium retaining means;

said shading container winding said continuous holographic recording medium round a rotatively contained shaft and shading external light; and said medium retaining means being intended for retaining an exposure portion vicinity of said holographic recording medium pulled out of a feeding opening in said shading container by using two members each having a cutout for transmitting said object light or said reference light.

6. The holographic recording medium cartridge according to claim 5, wherein said medium retaining means retains said holographic recording medium by providing a contact member touching said holographic recording medium and a presser plate member for letting said holographic recording medium closely contact with this contact member along the thickness direction of said holographic recording medium.

7. The holographic recording medium cartridge according to claim 6, wherein either or both of said contact member and said presser plate member is made of a magnetic material.

* * * * *